Sept 17, 1957   R. A. CHRISTIE   2,806,707
QUICK DETACHABLE TRANSPORT WHEELS FOR WINDROW HARVESTERS
Filed June 1, 1955   2 Sheets-Sheet 1
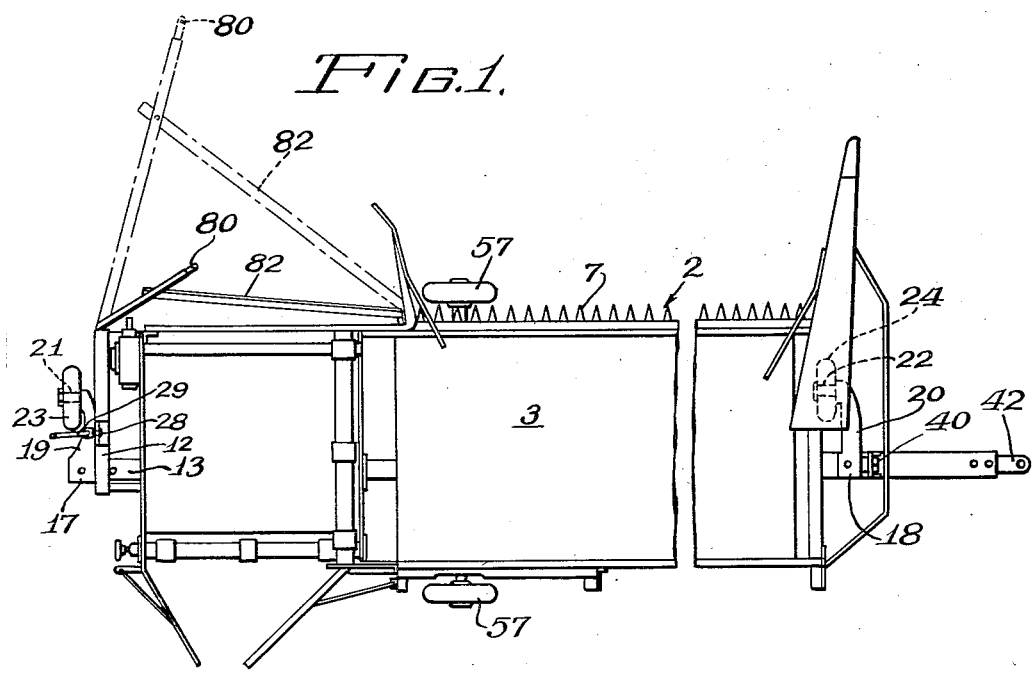
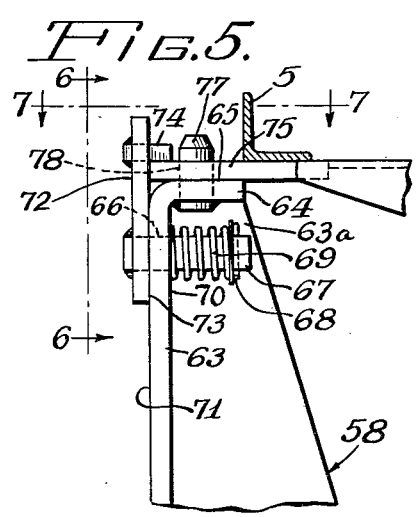
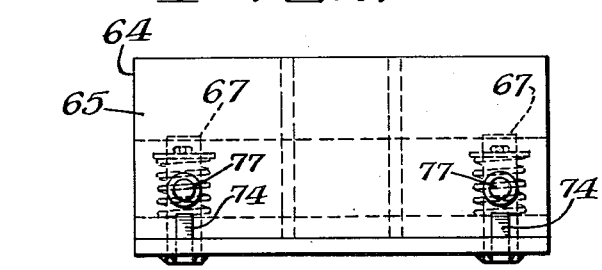
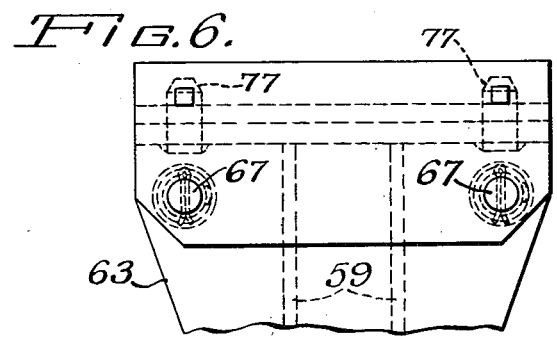
Inventor:
Reginald A. Christie
Atty.

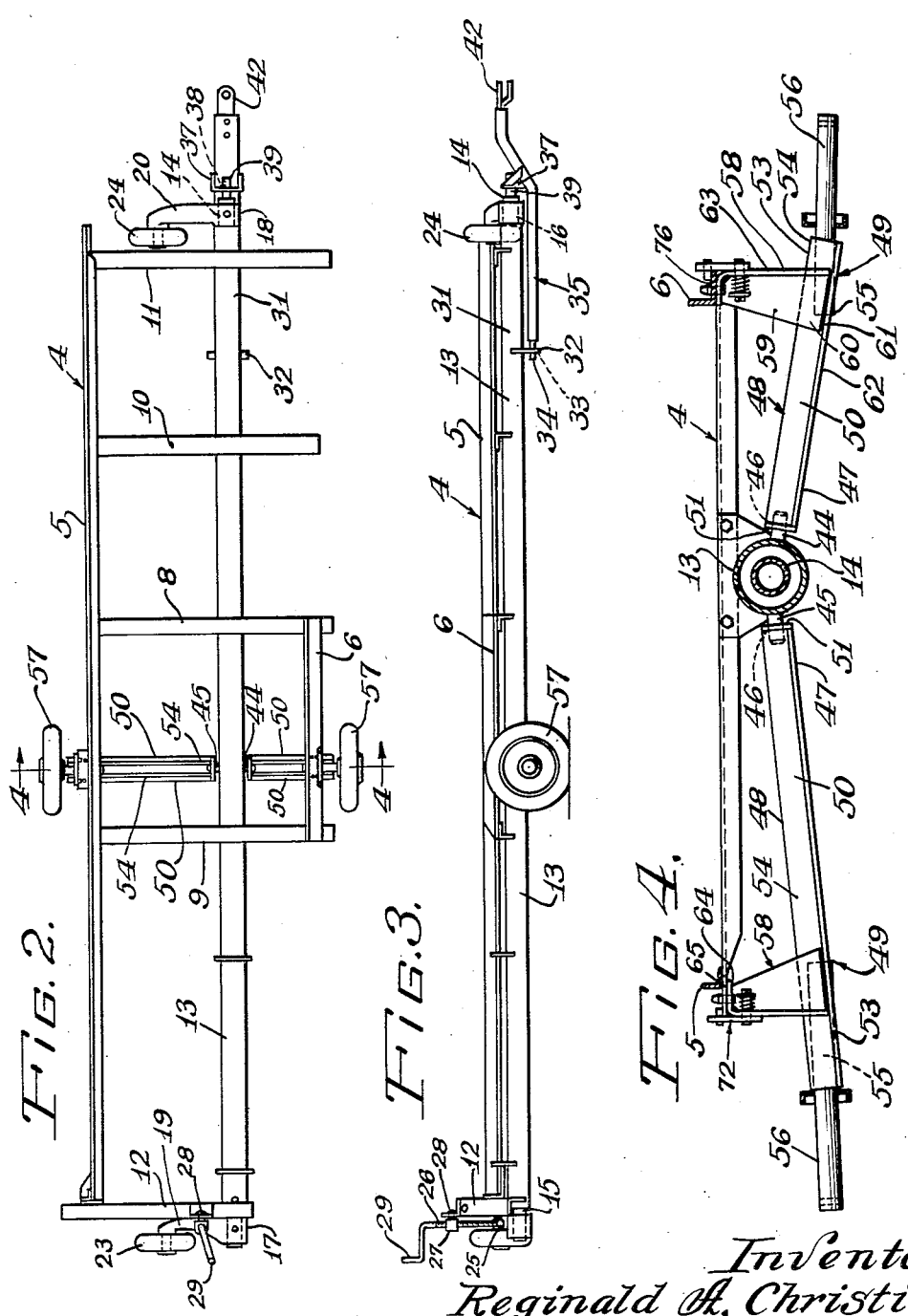

United States Patent Office 2,806,707
Patented Sept. 17, 1957

2,806,707

QUICK DETACHABLE TRANSPORT WHEELS FOR WINDROW HARVESTERS

Reginald A. Christie, Ancaster, Ontario, Canada, assignor to International Harvester Company, a corporation of New Jersey Application June 1, 1955, Serial No. 512,524

4 Claims. (Cl. 280—29)

This invention relates to windrow harvesters and more particularly to novel means for arranging the windrower in transport position.

Windrow harvesters of the type under consideration comprise an elongated platform which is moved in operating position widthwise of the field in order to gather a wide swath of crops. This type of disposition of a 12, 14 or 16 foot machine precludes its being moved in transport for any distance especially where highway travel is involved. Therefore it is incumbent to provide an arrangement for hauling the machine lengthwise so that it presents a narrow width as respects to the direction in which it is being moved. A further consideration in developing this type of an arrangement is to provide an arrangement which will not interfere with the operation of the machine in normal use. This is particularly essential in windrow harvesters wherein the platform is adjusted to operate at times close to the ground, and therefore it is mandatory that no understructure be provided on the platform which would interfere with such a disposition of the harvester platform.

A general object of the invention is to provide a simple, novel and effective means adapted for quick attachment and disconnection with respect to a windrower whereby the same may be easily transported or put into service operation.

A more specific object of the invention is to arrange certain parts of the windrower so that they serve not only as foundation structure while the machine is in operative position, but also as anchor means for the quick attachable transport assembly.

These and other objects of the invention will become more apparent from the specification and the drawing wherein:

Figure 1 is a plan view of a windrow harvester shown in association with the novel transport attachment, portions of the structure are being omitted which are not essential to the invention;

Figure 2 is a plan view of the platform frame structure shown in association with the invention;

Figure 3 is a rear view of the structure shown in Figure 2;

Figure 4 is an enlraged cross-sectional view taken substantially on the line 4—4 of Figure 2;

Figure 5 is a further enlarged view of a portion of the locking structure shown in Figure 4;

Figure 6 is an end view taken substantially on the line 6—6 of Figure 5, and

Figure 7 is a plan view taken substantially on the line 7—7 of Figure 5.

Describing the invention in detail the windrower generally designated 2 comprises a platform structure 3 which includes a foundation framework 4 having front and rear edge beams 5 and 6, the front beam 5 supporting the cutter bar 7 in the usual manner and the front and rear beams being interconnected by fore and aft extending braces 8 and 9 which together with other fore and aft braces 10, 11 and 12 support a longitudinal tube 13 which is connected with the braces. The tube rotatably journals a tubular rockshaft 14, the opposite outer extremities 15 and 16 (Fig. 3) of which project outwardly of the opposite ends of the tube and are connected to the rear ends 17 and 18 of the fore and aft forwardly extending arms 19 and 20, which is provided with spindle shafts 21 and 22 respectively and which mount carrier wheels 23, 24 which are rotatable on axes perpendicular to the line of travel of the harvester. One arm 19 may have a universal connection as at 25 (Fig. 3) to the lower end of an adjusting screw 26 which may have intermediate its ends a threaded engagement with a nut 27 which may be swivelly mounted as at 28 on the platform beam member 12. The upper end of the screw 26 may be provided with the crank 29 whereby the screw may be rotated for lowering and raising the wheels 23 and 24 attendant to swinging movement of the arms 19 and 20 together with the rockshaft 14.

It will be understood that for operating position the wheels would be lowered and for transport the wheels would normally be raised as best shown in Figure 3.

The tube 13 is provided adjacent to its end 31 (Figs. 2 and 3) with a depending lug 32 which has an aperture 33 extending axially lengthwise of the tube 31 which receives a peg or pin 34 on the inner end of a hitch element 35 which intermediate its ends is offset upwardly and provided with an upstanding lug structure 37 which is apertured at 38 and receives a stub extension 39 of the rockshaft 14, the extension 39 being provided with threads to receive a nut 40 for retaining the hitch in assembly with the platform. The outer end of the hitch is provided with a jaw 42 for reception of the tractor drawbar as will be readily understood by those skilled in the art.

The tube 13 is provided intermediate its ends with a pair of oppositely downwardly and outwardly extending pegs or pins 44 and 45, said pin 44 extending rearwardly and the pin 45 extendng forwardly and each pin projects through an aperture 46 on the inner end 47 of a beam structure or reach generally indicated 48 of a transport wheel assembly generally indicated 49. It will be seen that two such supported assemblies 49 are provided and that both are of identical construction and that beam assembly 48 of each extends diagonally upwardly and inwardly and is constituted of a pair of laterally spaced generally parallel L beam members 50 which at their inner or distal ends are interconnected by a transverse plate 51 within which the before-mentioned aperture 46 is provided and which is adapted to sustain the inner end 47 of the beam assembly 48. The outer or proximal ends 53 of the beam assembly 48 embrace between their vertical flanges 54 the inner end 55 of a stub shaft 56 and weld-connected thereto, said stub shaft 56 extending generally horizontally and journalling an associated wheel 57 thereon. The beam assembly 48 at its outer end is flanked by a pair of upright gusset or brace structures generally indicated 58 each of which possess a gusset plate 59 having a lower end 60 weld-connected to the external side of the upstanding flange 54 and at its lower edge seating as at 61 against the top side of the out-turned flange 62 of the related beam member 50. The outer edges of the gusset plate 59 are provided with an integral laterally extending flange member 63 which at its upper end is turned inwardly to provide an inwardly extending flange portion 64 which provides a seat 65 for the associated beam member 5 or 6 as will readily be seen in Figure 5. The upper end 63a of the brace structure is provided with apertures 66 through its flanges 63 which receive pins 67, the inner ends of which are provided with abutment means in the form of a washer and cotter key 68 for receiving the inner end of a spring 69 which is compressed between the washer and the inner side 70 of the flange 63, the pin 67 passing through the outer side 71 of the flange 63 and being fastened to a latch plate 72 which has its inner side 73 seated against the outer side 71 of the flange 63 and is drawn thereagainst by the expansion of the springs 69. The upper end of the plate is provided with a pair of lip structures or inwardly extending lugs 74 which are adapted to overlie the integral plate portion 75 of the front beam 4 or the flange 76 of the rear beam 6 to hold it between the same and a related seat 65. It will be observed that pins or interlocking means 77 are provided on the inner flange portion 64 which upstand from the seat 65 and through apertures 78 in the portion 75 or the rear flange 76 as will be readily seen in Figures 4 and 5.

Assuming that the parts are in assembled position as shown in Figure 4 in order to disconnect the transport wheels the latch members 72 are pulled outwardly against the compression of the springs 69 and are lowered to disengage the pins 77 from the opening 78 whereupon the entire structure may be pulled endwise to disengage the inner ends of the diagonal braces 48 from the pins 44 and 45. Of course, preparatory to thus removing these transport wheels the operating wheels 21 and 22 are lowered by suitably cranking the adjusting means 26 so that the ground wheels raise the platform any height so that the wheels 57 of the transport means are disengaged from the ground so that by merely disengaging or unlocking the latches 72 the transport assemblies will fall out of engagement.

In order to re-apply the transport wheels the inner ends of the beam assemblies 48 are inserted on the respective pins 44 and 45 and each assembly is moved upwardly with the latches and are held out to clear the portions 75 or 76 of the respective beams 5 and 6 and then the latches are released in order to overlap the interlocking lugs 74 with respective members 75 or 76 coincident with the entry of the pins 77 into respective apertures 78. The hitch 35 is applied merely by inserting the pin 34 endwise into the aperture 33 in the lug 32 and the lug 37 over the associated end of the shaft 14 and apply the nut 40 for holding the same. Thereafter the wheels 21 and 22 are cranked up and the structure is caused to rest on the transport wheels. The tractor is then moved to a position disengaging it from its hitch point 80 as shown in Figure 1 and the hitch 82 is raised and suitably anchored to the platform in raised position as shown in dotted lines in Figure 1 then the tractor is moved to a position where the jaw 42 is engaged and pinned to the drawbar.

What is claimed is:

1. A releasable wheel mounting comprising a stub shaft, a wheel thereon, a diagonal upwardly and inwardly extending beam structure connected to said stub shaft at one of its ends and transverse plate means connected to the other of its ends and having an aperture in said plate means for reception of associated mounting means, upright brace means having a lower end connected to said beam structure at said one end thereof and having an inwardly flanged upper extremity providing a seating surface for structure to be supported and having interlocking means thereon for cooperation with complementary means on the supported structure, and interlocking means associated with the upper extremity of said brace means comprising a plate extending across said brace means and seated against the external side thereof, means movably connecting the plate with said brace means for movement generally parallel to the seating surface and including means for yieldably drawing said plate against said brace means, and a lip structure on the plate spaced vertically from the seating surface in overlying relation thereto for receiving a portion of the supported structure between the same and the seating surface.

2. The combination with a supported structure having top and bottom sides, at least one free edge and a frame member with a transverse outwardly directed lug therebeneath, a wheel mounting comprising a reach beneath the supported structure having an apertured inner end receiving said lug and a wheel supported outer end, an upstanding portion connected to said reach adjacent to its outer end and having a transverse upper part providing an upwardly facing seat engaging said bottom side of the supported structure adjacent to said free edge thereof, an upstanding pin on said part projecting into an aperture in said structure, and a latch extending from said portion above said top side of the structure outwardly of said edge and having an inwardly projecting lug adapted to overlap said top side of the structure from said free edge thereof, and means movably mounting said latch on said portion for movement toward and away with respect to said edge and including spring means biasing said latch toward said edge.

3. The combination of a supported structure having top and bottom sides and a free edge, a wheel mounting comprising an elongated reach structure beneath said supported structure and having inner and outer ends, releasable interlocking means on said inner end of the reach structure and said supported structure relatively separable and engageable attendant to movement of said wheel mounting lengthwise of said reach structure respectively away and toward said supported structure, wheel means mounted on the outer end of said reach structure, a standard connected to said reach structure adjacent to said outer end thereof, and having an upper end including a transverse portion with a seat engaging a portion of said bottom side of said supported structure adjacent to said edge thereof, a vertical pin on one of said portions extending into an aperture in the other portion, and a latch spring-mounted upon said standard and disposed outwardly of said free edge of the supported structure and having a part extending over and engaging said top side of said supported structure and movable toward said edge and away therefrom to respectively engage and disengage said part with said supported structure.

4. A releasable wheel mounting for a supported structure comprising a stub shaft, a wheel thereon, a diagonal reach extending upwardly away from said wheel and having a proximal end connected to the stub shaft and having a distal end including interlocking means thereon for cooperation with associated mounting means on the supported structure, an upright standard having a lower end connected to said reach adjacent to its proximal end and having an upper end with a portion providing a seating surface for the supported structure and having interlocking means for cooperation with complementary means on the supported structure, and latching means associated with the upper end of said standard and comprising a member seated against the external side thereof and extending upwardly above said surface, means movably connecting said member to said standard for movement toward and away from said surface and including means for yieldably drawing the member toward said standard, and a lip structure on said member spaced vertically from said surface in overlying relation thereto for receiving a portion of the supported structure between the same and the seating surface.

References Cited in the file of this patent

UNITED STATES PATENTS

| 851,345 | Crane | Apr. 23, 1907 |
| 2,587,624 | Johnson | Mar. 4, 1952 |
| 2,696,772 | Undersown | Dec. 14, 1954 |

FOREIGN PATENTS

| 15,597 | Great Britain | Nov. 30, 1886 |